July 31, 1928.
J. H. HAMMOND, JR
EXPOSURE INDICATING DEVICE FOR CAMERAS
Original Filed June 1, 1921
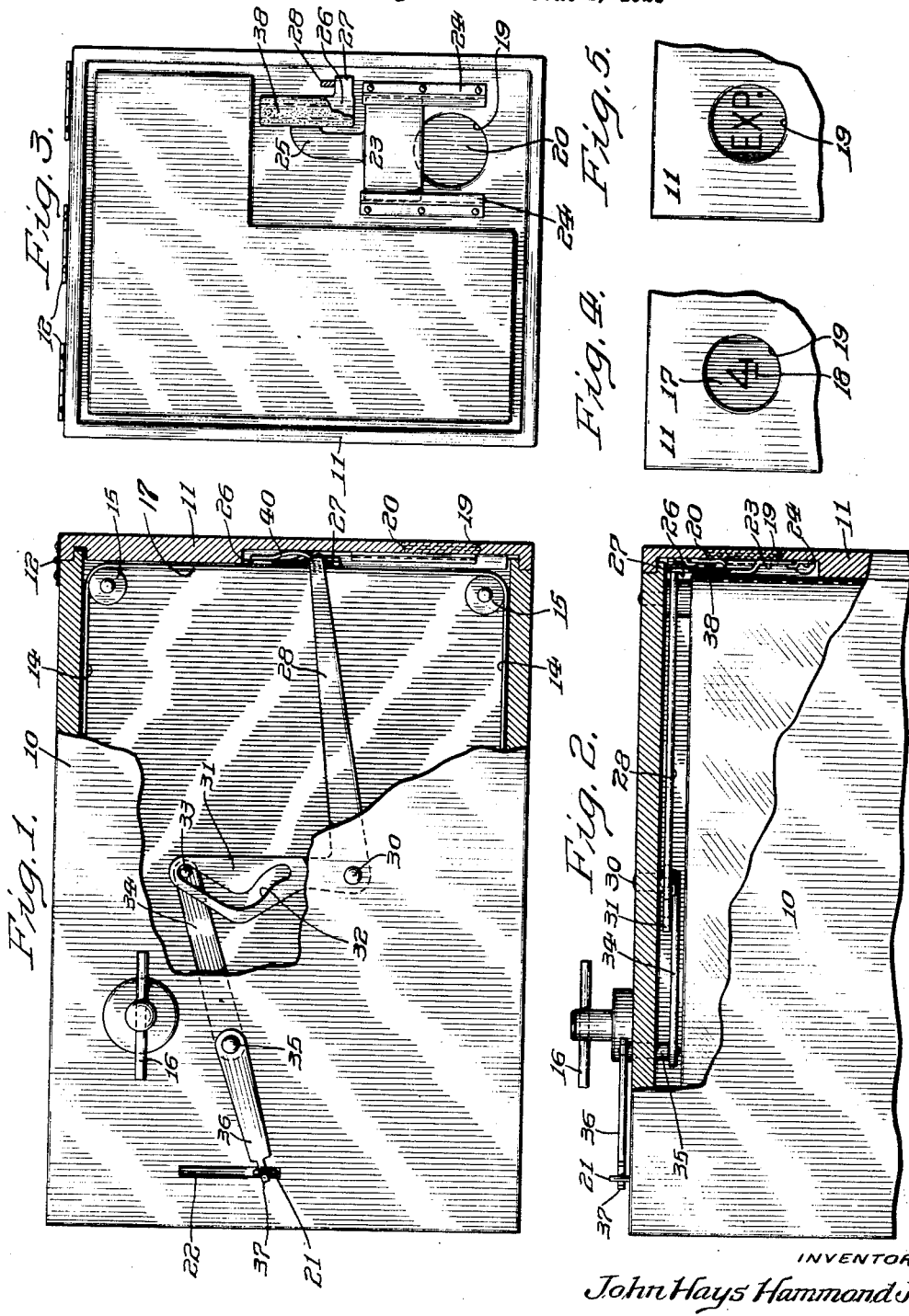
INVENTOR
John Hays Hammond Jr.
WITNESS
BY
ATTORNEY Patented July 31, 1928.

1,678,729

UNITED STATES PATENT OFFICE.

JOHN HAYS HAMMOND, JR., OF GLOUCESTER, MASSACHUSETTS.

EXPOSURE-INDICATING DEVICE FOR CAMERAS.

Application filed June 1, 1921, Serial No. 474,146. Renewed December 2, 1927.

Some of the objects of the present invention are to provide means for indicating whether or not a portion of a film roll has been exposed for picture taking purposes; to provide means for reducing to a minimum the chance of taking two pictures upon the same portion of a camera film; to provide means controlled by the shutter mechanism of a camera for indicating whether or not a picture has been taken upon the portion of a film in register with the camera lens; and to provide other improvements as will hereinafter appear.

In the accompanying drawings, Fig. 1 represents a top plan of a camera embodying one form of the present invention, certain portions being broken away; Fig. 2 represents a side elevation in part section of a portion of the camera; Fig. 3 represents an elevation of the inner side of the end closure of the camera; Fig. 4 represents a fragmentary portion of the end closure showing the film indicating opening; and Fig. 5 represents a view similar to Fig. 4 with certain parts in a different position.

Referring to the drawings, one form of the present invention is shown in connection with a camera 10 of standard form, which has a swinging back 11 pivoted at 12, so that ready access may be had to the inside of the camera 10 when desired. The camera 10 is provided with the usual movable film 14 which traverses in close proximity to the inner wall of the camera box passing across the inner side of the back 11, where it is guided by idle feed rollers 15, being wound upon the usual reel spool by a winding handle 16 which projects through the top of the camera 10 in a well known manner. The film 14 is protected upon its outer side by the ordinary black paper 17 or other light intercepting means, having indicating numbers 18 consecutively arranged at suitable spaced distances to indicate the number of films which have been exposed. These numbers 18 are so located as to register respectively with a sight opening 19 having a red or other colored transparent material 20 to prevent light rays from affecting the film, and through which the respective numbers 18 are visible. The camera 10 is also provided with the usual or any suitable lever 21 projecting through a slot 22 in the top for the purpose of operating the usual shutter of the camera in a well known manner by moving the lever 21 from one extreme position to the other.

For automatically indicating whether or not any particular portion of the film 14 has been exposed by the action of the camera shutter, a slide 23 is provided and arranged to move in guides 24 fixed to the back 11 at opposite sides of the opening 19 so that in one position of the slide 23 the opening 19 is unobstructed to give a clear view of the numbers 18, and in another position the opening 19 is internally covered by the slide 23. In this latter position the letters "EXP." or other suitable data upon the slide 23 are exposed to indicate that an exposure of a portion of the film has been made.

For moving the slide 23 to its position closing the opening 19, it is provided with an integral extension 25 which carries a plate 26 having a lug 27 arranged in the path of movement of the long arm 28 of a bell crank lever. This bell crank lever is pivoted at 30 to the camera body at a convenient location and has its short arm 31 provided with a cam slot 32 receiving a pin 33 fast to one end of an arm 34, which is rigid with a movable pivot 35. This pivot 35 projects through the top of the camera box and has an arm 36 fixed thereon having a tongue 37 passing through the projecting lever 21, which is suitably apertured for the purpose. This operating arrangement, including the cam slot 32, is such that each operating movement of the shutter lever 21 causes the long arm 28 to be reciprocated. Thus the movement of the shutter lever 21 first moves the arm 28 to shift the slide 23 to cover the opening 19 and then returns the arm 28 to its former position, leaving the slide 23 in covering position.

In order to return the slide 23 to normal position, the film side of the plate 26 has fixed thereon a pad 38 of some suitable friction material, while the opposite side of the plate 26 is acted upon by a spring 40 interposed between the back 11 and the plate 26, the action being to normally press the friction pad 38 against the back of the film. This pressure is sufficient to cause the pad 38, plate 26 and slide 23 to move with the film, when the latter is fed is the usual manner by rolling up a length of film after exposure, but the pressure is insufficient to interfere with such feeding after the shutter 23 has been returned to its normal position.

In the operation of the device, the camera film and the mechanism of the present invention are shown in Figs. 1 to 4 in a position before a picture is taken, the film being in a position to be exposed for the fourth picture as indicated by the number "4" through the opening 19. When it is desired to take a picture, the lever 21 is moved from the position shown to the other end of the slot 22, thereby operating the shutter to make the exposure, and also swinging the arm 36 so that the arm 34 moves the pin 33 in the cam slot 32. The result of this movement is first to rotate the bell crank arm 28 in a clockwise direction and second to then rotate it back to its former position, the angular movement being the same in each case. The forward movement of the bell crank arm 28 picks up the lug 27 and moves the plate 26, pad 38 and slide 23 together so that the slide 23 covers the opening 19, while on the return movement of the bell crank arm 28, the slide 23 and its parts remain in the new position until the film is turned to bring an unexposed portion into place. As soon as the film moves the friction pad pressure causes the slide 23 to move with the film until the opening 19 is uncovered and the lug 27 is again in a position to be engaged by the bell crank arm 28 when the shutter lever 21 is again actuated. Thus every time a picture is taken the slide 23 is moved over the opening 19 to indicate an exposure has been made, and when a new length of film is in registering position the slide 23 will have uncovered the opening 19 and made visible the film number.

From the foregoing it will be evident that a means has been provided for indicating whether or not a film in position has been exposed and materially reduces the chances of taking a second picture upon an already exposed film. It frequently happens that a picture is taken and then the operator neglects to wind off the exposed portion and bring an unexposed portion into position. In consequence the next time the camera is used the operator has forgotten whether a new film is in position or not, with the result that a second exposure is often made upon a prior exposure. By the present invention such mistakes cannot occur because a glance at the opening 19 will indicate the film condition. Thus, if "EXP." is visible the film must be wound to a new position, while if a number is visible the film is ready to be exposed.

While in the foregoing the slide 23 is described as operating in conjunction with the usual opening for showing the number of the film to be used, it will be understood this is only by way of example and that a separate opening or any other means may be employed without departing from the invention.

Having thus described my invention, I claim:

1. In an indicating device, the combination of a camera having an opening through which film digits may be observed, means for indicating in said opening when an exposure has been made by said camera, and means in continual frictional engagement with the film surface and actuated by movement of the film for restoring said indicating means immediately upon movement of the film.

2. In an indicating device, the combination of a camera having an opening through which film digits may be observed, a shutter operating means therefor, means controlled by said shutter operating means for indicating in said opening when an exposure has been made by said camera, and means in continual frictional engagement with the film surface and actuated by movement of the film for restoring said indicating means immediately upon movement of the film.

3. In an indicating device, the combination of a camera body having an opening through which film digits may be observed, means arranged to register with said opening to indicate when an exposure has been made by said camera, and means in continual frictional engagement with the film surface and actuated by movement of the film for restoring said indicating means immediately upon movement of the film.

4. In an indicating device, the combination of a camera body having an opening through which film digits may be observed, a shutter operating means, means actuated by said shutter operating means for indicating in conjunction with said opening when an exposure has been made by said camera, and means in continual frictional engagement with the film surface and actuated by movement of the film for restoring said indicating means immediately upon movement of the film.

5. In an indicating device, the combination of a camera body having an opening through which film digits may be observed, a shutter operating means, means actuated by said shutter operating means for displaying in said opening an indication that an exposure has been made, and means in continual frictional engagement with the film surface and actuated by movement of the film for restoring said indicating means immediately upon movement of the film.

6. In an indicating device, the combination of a camera body having an opening through which film digits may be observed, a shutter operating means, means actuated by said shutter operating means for displaying in said opening an indication that an exposure has been made, said camera containing a movable film, and means having continual frictional engagement with said film actuated by the movement of said film for removing said indication from said opening immediately upon movement of the film.

7. In an indicating device, the combination of a camera body having an opening through which film digits may be observed, a shutter operating means, an indicating member, means operated by said shutter operating means for moving said indicating member with respect to said opening, said camera having a movable film, and means having frictional engagement with said film actuated by the movement of said film for moving said indicating member with respect to said opening immediately upon movement of the film.

8. In an indicating device, the combination with a camera having a movable light sensitive element, an opening through which indicia upon said light sensitive element may be observed, of means for indicating in said opening when an exposure has been made upon said element, and means in continual frictional engagement with said light sensitive element and actuated immediately upon movement thereof for restoring said indicating means.

9. In an indicating device for a camera body, a light sensitive element movably positioned within said camera, a camera having an opening through which indicia on said element may be observed, a shutter for said camera, means for operating said shutter to expose to light a portion of said light sensitive element, means actuated by said shutter operating means for displaying in said opening an indication that an exposure has been made, and means in continual frictional engagement with said light sensitive element and operated immediately upon movement thereof to restore said indicating means.

10. In an indicating device for a camera, the combination of a camera body, a light sensitive element movably positioned within said camera, a camera having an opening through which indicia on said element may be observed, a shutter for said camera, means for operating said shutter to expose to light a portion of said light sensitive element, means actuated by said shutter operating means for displaying in said opening a target that an exposure has been made, and means in continual frictional contact with said light sensitive element and operated immediately upon movement thereof to restore said target.

Signed at New York, in the county of New York, and State of New York, this 25th day of May, 1921.

JOHN HAYS HAMMOND, Jr.